United States Patent [19]
Zbikowski et al.

[11] Patent Number: 5,713,002
[45] Date of Patent: Jan. 27, 1998

[54] MODIFIED BUDDY SYSTEM FOR MANAGING STORAGE SPACE

[75] Inventors: Mark Zbikowski, Woodinville; Robert L. Ferguson, Seattle, both of Wash.

[73] Assignee: Microsoft Corporation, Redmond, Wash.

[21] Appl. No.: 542,695

[22] Filed: Oct. 13, 1995

Related U.S. Application Data

[63] Continuation of Ser. No. 86,334, Jun. 30, 1993, Pat. No. 5,490,274.

[51] Int. Cl.[6] ............................................. G06F 12/02
[52] U.S. Cl. ............................... 395/439; 395/497.01
[58] Field of Search .............................. 395/439, 497.01, 395/482.04, 621, 622

[56] References Cited

U.S. PATENT DOCUMENTS

| | | | |
|---|---|---|---|
| 4,536,837 | 8/1985 | Olson et al. | 364/200 |
| 5,247,634 | 9/1993 | Cline et al. | 395/425 |

OTHER PUBLICATIONS

Knuth, "The Art of Computer Programming," Second Edition, vol. 1, Fundamental Algorithms; 1973; pp. 442–445.

Koch, Philip D.L., "Disk File Allocation Based on the Buddy System," ACM Transactions on Computer Systems, vol. 5, No. 4, Nov. 1987; pp. 352–370.

Leffler, Samual J. et al., "The Design and Implementation of the 4.3BSD UNIX Operating System," Addison-Wesley Publishing Company; Chapter 7; 1989; pp. 187–223.

*Primary Examiner*—Thomas M. Heckler
*Attorney, Agent, or Firm*—Seed and Berry LLP

[57] ABSTRACT

A modified buddy system is adopted for managing disk space in a disk storage. The modified buddy system uses a minimal amount of memory space and provides very quick access to extents within the disk space. The modified buddy system utilizes a tree structure of nodes, wherein each node represents an extent of disk space. A bitmap is provided for holding state bits for each of the nodes in the tree structure. The bitmap is organized to preserve locality of reference.

36 Claims, 8 Drawing Sheets

MODIFIED BUDDY SYSTEM FOR MANAGING STORAGE SPACE

CROSS REFERENCE TO RELATED APPLICATION

This application is a continuation of U.S. patent application Ser. No. 08/086,334, filed Jun. 30, 1993, now U.S. Pat. No. 5,490,274.

TECHNICAL FIELD

The present invention relates generally to data processing systems and, more particularly, to a modified buddy system for managing disk space in a data processing system.

BACKGROUND OF THE INVENTION

Free space on disk has generally been managed in one of three ways. In a first approach, the allocation of a disk space for a file has been described by a linked list of sectors allocated to the file. In a second approach, a bitmap has been provided to monitor which sectors of disk space have been allocated. A bit is provided in the bitmap for each sector. The value of the bit associated with the sector specifies whether the sector has been allocated or not. In a third approach, allocation is performed on extents (i.e., a contiguous set of sectors on the disk). As such, space is allocated in ranges of adjacent sectors rather than in individual sectors.

SUMMARY OF THE INVENTION

In accordance with a first aspect of the present invention, a method is practiced in a data processing system having disk storage with disk space of a given size. In this method, disk space is managed by initially modeling the disk space as a tree structure having multiple levels of nodes wherein the levels successively decrease from a top level to a bottom level. Each node in each level represents an extent of the disk space and, for each level, nodes within the level represent extents of a like size. The size of the extents represented by the nodes decreases with decreasing level, but the number of nodes increases with decreasing level. The sum of the sizes of the nodes for each successive level equals the given size of the disk space. Each node in each level represents an extent of the disk space and, for each level, nodes within the level represent extents of a like size. Each node in each level other than the bottom level is a parent node having links connecting the parent node to the child nodes in a next successive level. The child nodes are siblings of each other. The child nodes represent extents that are subdivisions of the extent represented by the parent node. State information about each node is stored in the bitmap that specifies whether the extent represented by the node is known to be at least partially allocated or not. The bitmap of the tree structure is used to manage the disk space.

The state information may constitute at least one state bit for each node in the tree structure. The bitmap is preferably an ordered bitmap where the state bits for the nodes are ordered in a breadth first fashion beginning with the top level and continuing in breadth first fashion for each successive level. Ordering the bitmap in this fashion provides locality of reference for sibling nodes and parent nodes.

DETAILED DESCRIPTION OF THE INVENTION

In the preferred embodiment of the present invention, disk space is modeled as a tree structure of nodes, wherein each node of the tree represents an extent of disk space and has an associated state. The state information for each node is stored in a bitmap that is ordered in a fashion that exploits locality of reference. The bitmap is ordered in a fashion corresponding to the tree structure so that the bitmap holds state bits for siblings in adjacent locations. The use of the tree structure and bitmap within the preferred embodiment of the present invention allows free disk space to be quickly located and allocated. Moreover, the overhead associated with using the tree structure and bitmap is minimal because memory space is not wasted by the bitmap and tree structure.

Figure 1:
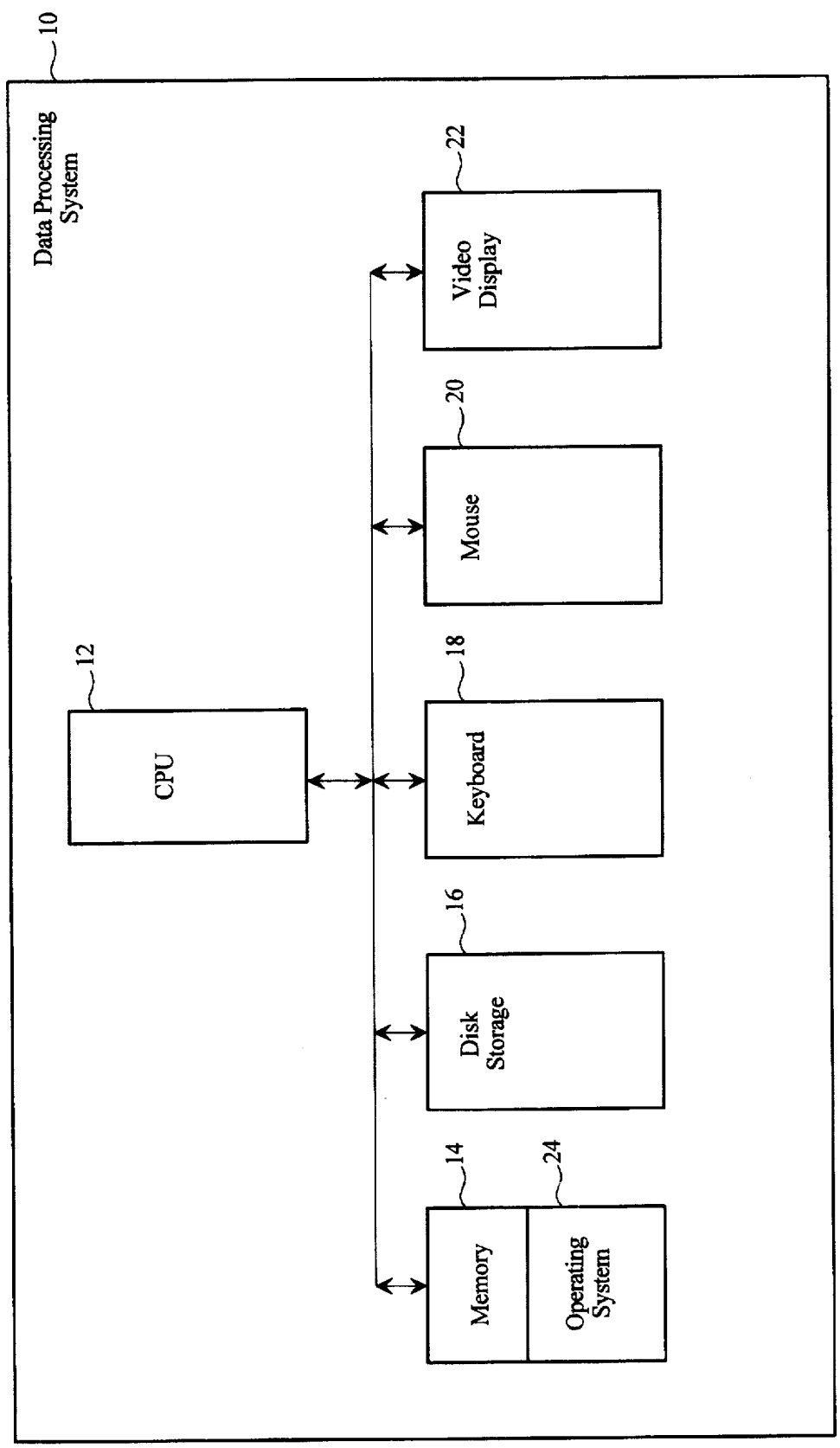
FIG. 1 is a block diagram of a data processing system suitable for practicing a preferred embodiment of the present invention.

FIG. 1 is a block diagram of a data processing system 10 that is suitable for implementing the preferred embodiment of the present invention. The data processing system 10 includes a central processing unit (CPU) 12 that has access to a memory 14 and disk storage 16. The preferred embodiment of the present invention manages the free space on disk in the disk storage 16 by adopting a modified buddy system that will be described in more detail below. The data processing system 10 also includes a keyboard 18, a mouse 20 and a video display 22.

Figure 2:
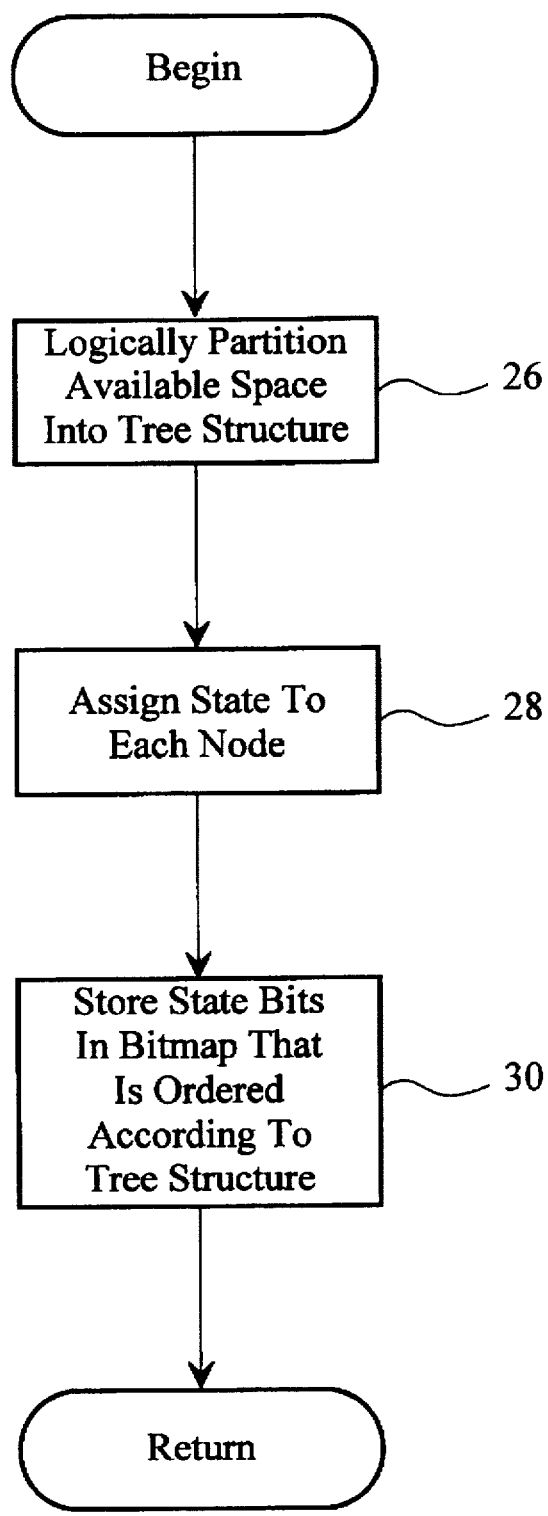
FIG. 2 is a flow chart illustrating steps performed to implement the preferred embodiment of the present invention.

The preferred embodiment of the present invention is implemented in an operating system 24 held in memory 14. Those skilled in the art will appreciate that the present invention need not be implemented in an operating system but may also be implemented in separate code modules that work in conjunction with an operating system. FIG. 2 is a flow chart showing the steps performed by the operating system 24 to build the tree structure and bitmap for implementing the modified buddy system of the preferred embodiment of the present invention. FIG. 2 will be described in conjunction with FIGS. 3A and 3B. Initially, the available disk space and disk storage 16 (FIG. 1) is logically partitioned into a tree structure like that shown in FIG. 3A (step 26 in FIG. 2). The top level of the tree structure 32 (FIG. 3A) is the root node 34 of the tree structure. It represents an extent of the entire available disk space in disk storage 16 (i.e., 4K in FIG. 3A). The next level of the tree structure 32 holds nodes that represent smaller extents of disk space. The extents represented by this node constitute a complete subdivision of the extent represented by root node 34. In the example shown in FIG. 3A, nodes 36 and 38 represent extents of one-half of the available disk space (i.e., 2K of the available 4K of disk space). The next level of the tree structure 32 holds nodes 40, 42, 44 and 46 which represent smaller extents than represented by nodes 36 and 38 from the previous level. Specifically, the extents represented by nodes 40 and 42 represent a complete subdivision of the extent represented by node 36, and the extents represented by nodes 44 and 46 represent a complete subdivision of the extent represented by node 38. Each of the nodes at this bottom level 40, 42, 44 and 46 is 1K in size and represents an extent that is the smallest-sized unit of allocation available for disk storage 16.

Each of the nodes of the tree structure 32 includes logical links that connect the nodes between successive levels. For example, node 34 is connected by links 47 to nodes 36 and 38. Node 34 is referred to as a parent node and 36 and 38 are referred to as child nodes. At each level of the structure 32, the extents represented by the child nodes constitute a complete subdivision of the extent represented by the parent node. Nodes 36 and 38 are siblings of each other. The sibling nodes are also known as buddies in that they represent extents that are subdivisions of a same extent (represented by the parent node). The "buddy system" is a well-known approach to allocating/deallocating memory space by exploiting the notion of buddies.

Figure 3A:
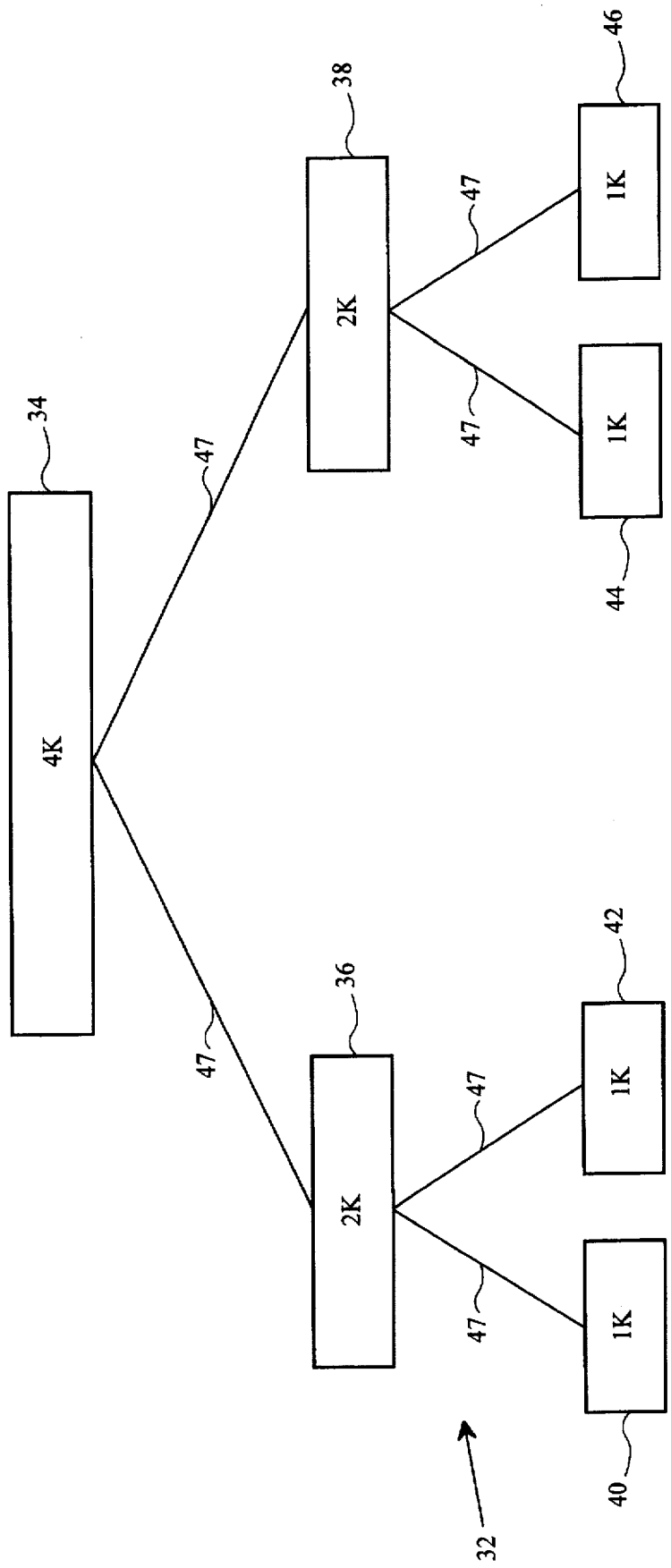
FIG. 3A is an illustrative tree structure used in the preferred embodiment of the present invention.
Figure 3B:
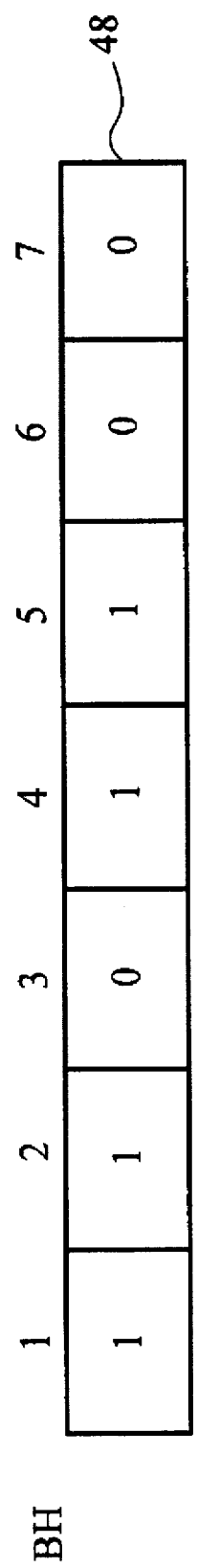
FIG. 3B is an illustrative bitmap for the tree structure of FIG. 3A.

It should be appreciated that the tree structure shown in FIG. 3A is merely illustrative and each parent node may include more than two children nodes.

Each node 34, 36, 38, 40, 42, 44 and 46 in the tree structure 32 is assigned a state. This state is represented by a bit. A "1" value for the state bit of a node indicates that the extent represented by the node is known to be either allocated or partially allocated. In contrast, a "0" value for the state bit of a node indicates that the extent represented by the node is not known to be allocated or partially allocated. Initially, all of the nodes have a state bit with a value of "0". The state bits are stored in a bit map 48 (FIG. 3B) that is ordered according to the tree structure. This bitmap 48 holds all of the state bits for the nodes of the tree structure 32 (FIG. 3A). The bits in the bitmap 48 are ordered in a breadth first fashion beginning with the root node 34. Thus, bit 1 (FIG. 3B) of the bitmap 48 holds the state information for the root node 34. Bit 2 holds the state information for node 36, and bit 3 holds the state information for node 38. Similarly, bit 4 of bitmap 48 holds the state information for node 40 and bits 5, 6 and 7 hold the state information for nodes 42, 44 and 46, respectively. This organization allows the state bits for child nodes to be quickly located when one knows the bit position of the parent and vice versa. In particular, for any non-leaf node n (whose state bit is at position n in the bitmap), its children are at positions 2n and 2n+1 in the bitmap.

In order to utilize the tree structure 32 and bitmap 48, the operating system 24 supports an allocate function, a deallocate function, a find function and a test function. Each of these functions operate on a node in the tree structure 32 and will be described in more detail below. The discussion of these functions will focus initially on the test function because the test function is used by selected ones of the other functions.

Figure 4:
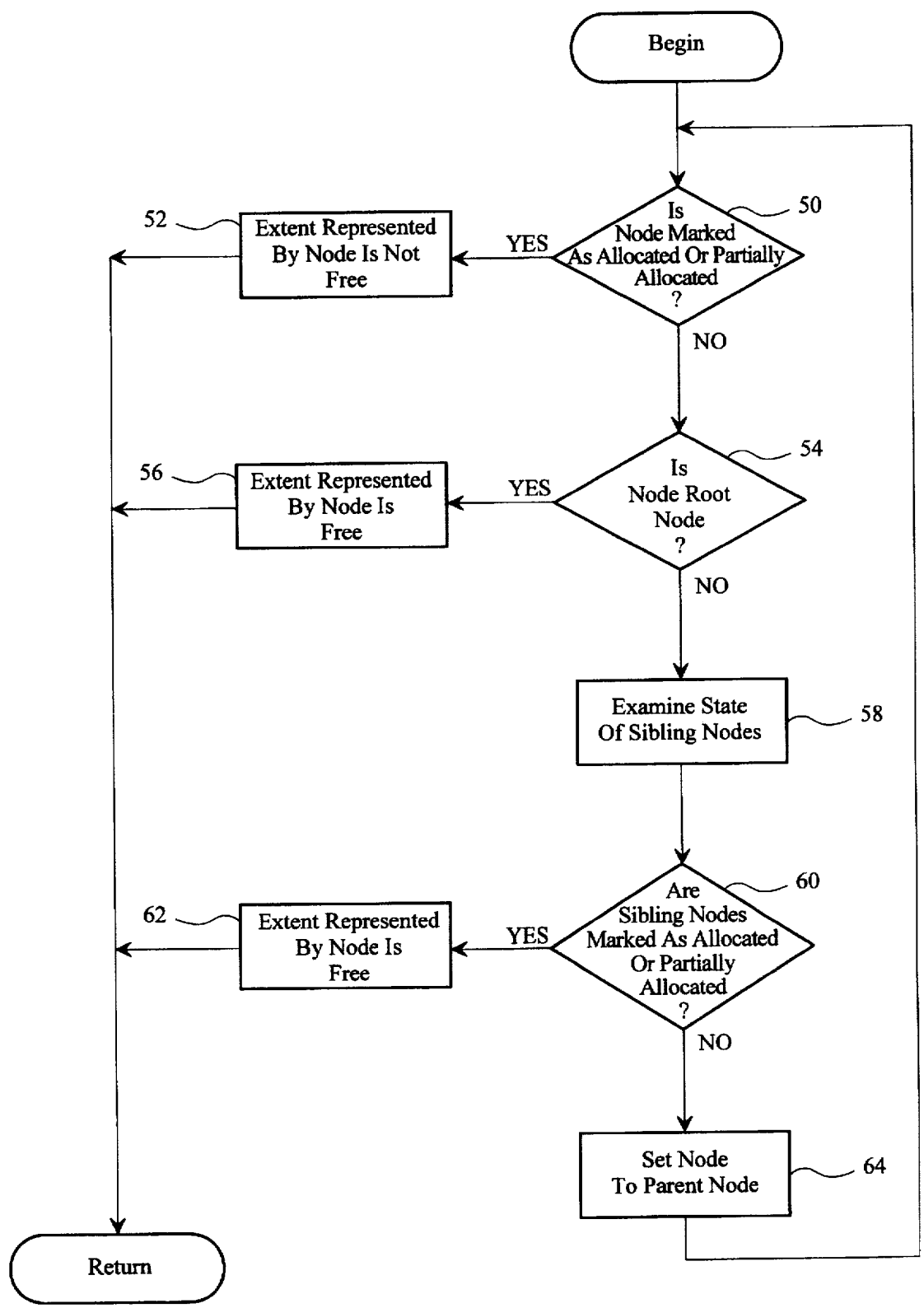
FIG. 4 is a flow chart illustrating the steps performed in a test function of the preferred embodiment of the present invention.

FIG. 4 is a flow chart of the steps performed by the test function for a binary tree implementation. It should be appreciated that this function may be generated to work for N-ary trees where each has N children. The test function tests whether an extent represented by a node is free or not. The node to be tested is passed as a parameter to the test function. The operating system 24 initially checks whether the node in question has a state bit with a value of "1", which indicates that the extent represented by the node is known to be allocated or partially allocated (step 50 in FIG. 4). If the state bit of the node has a value of "1", the test function returns a result that the extent represented by the node is not free (step 52 in FIG. 4). If, on the other hand, the state bit of the node has a value of "0", it is unknown whether the extent represented by the node is free. The node may have a state bit with a value of "0" and already be allocated because its parent or other ancestor has already been allocated or, alternatively, the extent represented by the node may be free. The test function next checks whether the node is the root node (step 54). If the node is the root node, since it has a state bit with a value of "0", the extent represented by the node is free (it does not have a parent that can be allocated), and the test function returns an indication that the extent represented by the node is free (step 56).

If the node is not the root node, the test function examines the value of the state bit of sibling nodes (step 58). For example, if the state of node 36 (FIG. 3A) is being examined, node 38 is its only sibling node, and the state of the node 38 is examined in step 58 of FIG. 4. The test function checks whether any sibling node has a state bit with a value of "1" (step 60). In the more generalized test function, the state bits for all of the siblings are examined until a sibling with a state bit having a value of "1" is found or until all of the state bits for the siblings have been examined. If any sibling node has a state bit with a value of "1", the extent represented by the parent node is not completely allocated. Accordingly, the test function returns an indication that the extent represented by the node in question is free (step 62).

If the state bits of all of the sibling nodes have a value of "0", the process continues up the tree structure 32 by considering the parent node as the current node (step 64) and repeating the previously described steps beginning with step 50.

Figure 5:
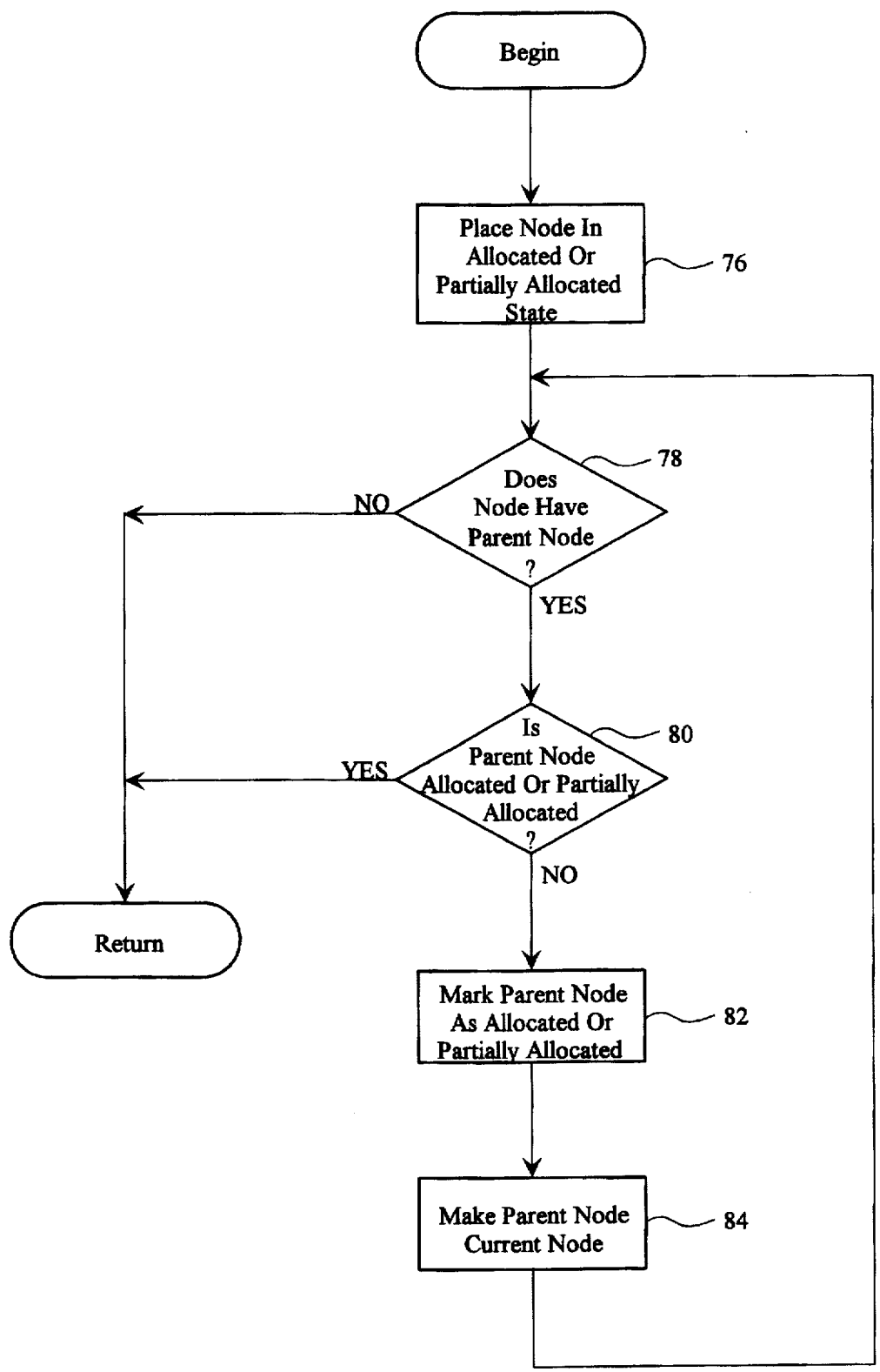
FIG. 5 is a flow chart illustrating the steps performed in an allocate function of the preferred embodiment of the present invention.

As mentioned above, the operating system 24 supports the allocate function. The allocate function allocates free space (i.e., extents) in the disk space of disk storage 16. FIG. 5 is a flow chart of the steps performed by the allocation function. The state bit for the node represents the extent to be allocated is assigned a value of "1" (step 76 in FIG. 5). A determination is then made whether the node has a parent node (step 78). If the node does not have a parent node, no further steps need to be performed. In contrast, if the node has a parent node, the value of the state bit of the parent node is examined to determine if the parent node is marked (i.e., has a value of "1") as allocated or partially allocated (step 80). If the parent node is already marked as allocated or partially allocated, no further steps need to be performed. However, when the parent node has not been marked as allocated or partially allocated, the state bit of the parent node must be updated to have a value of "1" to indicate that at least a portion of the extent represented by the parent node is known to be allocated (step 82). This process then continues up the tree structure 32 by considering the parent node as the current node (step 84). The above-described steps beginning at step 78 are then repeated. Since at least a portion of each of the parent nodes has been allocated, the state bits held in the bitmap 48 must be updated to a value of "1" by the above-described function.

Figure 6:
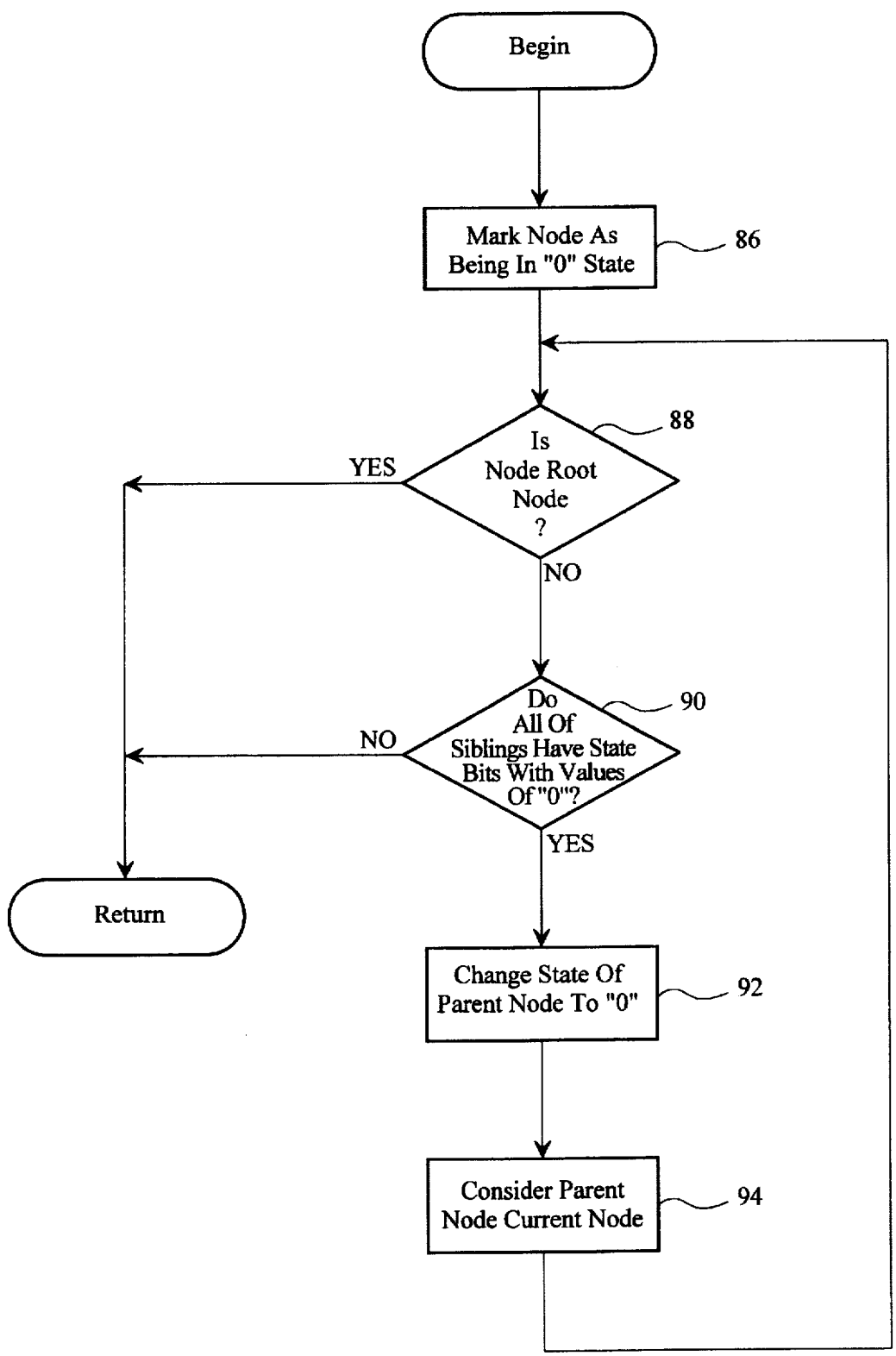
FIG. 6 is a flow chart of the steps performed in a deallocate function in the preferred embodiment of the present invention.

The operating system 24 also supports a deallocate function that deallocates an extent of disk space in disk storage 16. The node representing the extent to be deallocated is passed as a parameter to the deallocate function. FIG. 6 is a flow chart of the deallocation function supported by the operating system 24. When an extent represented by a node is to be deallocated, the state bit of the node is marked to have a value of a "0" (step 86 in FIG. 6). Since the extent represented by the node may be the only portion of the extent represented by the parent node or the extents represented by other ancestor nodes which is allocated, a determination must be made whether the parent and ancestor nodes should also have their state bits updated to assume a value of "0". The process of updating the state bits of the parent node and ancestor nodes begins by checking whether the node is the root node (step 88). If the node is the root node, it has no parent node or ancestor nodes and, therefore, no further steps are required. In contrast, if the node is not the root node, the state bits of the sibling nodes are examined (step 90). If the state bit for any sibling node is "1" (i.e., all the state bits for the sibling nodes are not "0"), the state bit of the parent node cannot be updated because the extent that the parent node represents is known to be at least partially allocated. If the state bits for all of the sibling nodes have values of "0", the extent represented by the parent node must necessarily be free because all of the extents represented by the children nodes are not allocated or partially allocated. Accordingly, the state bit of the parent node is changed to a value of "0" (step 92). This process then continues for the additional ancestors by considering the parent node as the current node and repeating the above-described steps beginning with step 88. In this fashion, all of the ancestors are updated as needed.

Figure 7:
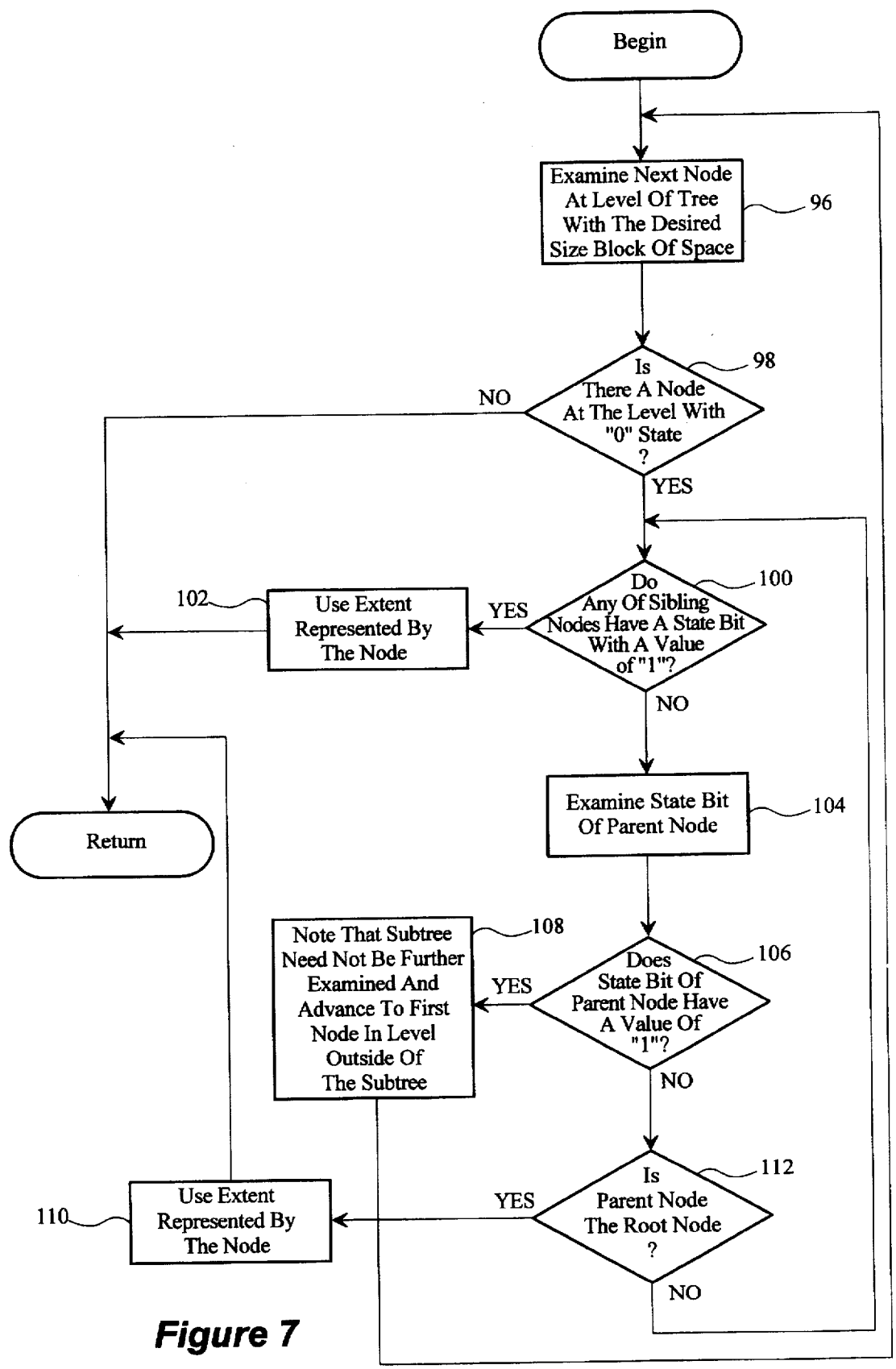
FIG. 7 is a flow chart illustrating the steps performed by a find function in the preferred embodiment of the present invention.

The operating system 24 additionally supports the find function, which finds a free node within the tree structure 32 (FIG. 3A). FIG. 7 is a flow chart of the steps performed by the find function. The search performed by the find function begins by looking at the state bit of a next node at the level of the tree that has the desired size extent (step 96). In particular, if the desired amount of disk space does not match the size of any of the extents represented by the nodes of the tree structure 32, the closest matching extent which is larger than that needed is selected in step 96. This extent size will be referred hereinafter to as the "desired size". At the level of the tree having the desired size extent of disk space, the find function determines if there is a node at the level having a state bit with a value of "0" (step 98). If there is not a node at the level having a state bit with a value of "0", there is not an extent of the desired size available.

However, if there is a node at the level having a state bit with a value of "0", the sibling nodes of the node are examined to determine if any of the sibling nodes have a state bit with a value of "1" (step 100). If any of the sibling nodes have a state bit with a value of "1", the extent represented by the node is returned by the find function and utilized (step 102). If, on the other hand, the state bits for all of the sibling nodes have values of "1", the state bit of the parent node is examined (step 104). In particular, a determination is made whether the state bit of the parent node has a value of "1" (step 106). If the parent node has a state bit with a value of "1", it is noted that the subtree beginning with the parent node as its root does not need to be further examined (step 108), and the search for a free node continues again at step 96. If the state bit of the parent node does have a value of "1" and the parent node is not the root node (step 112), the above-described steps are repeated beginning at step 100 by examining the sibling nodes of the parent node. If the parent node is the root node (see step 112), the find function returns the extent represented by the current node as being free (step 110).

In the above discussion of the find function, it is apparent that the test function may be directly integrated into the find function. Integrating the test function and the find function allows an efficiency gain by enabling the algorithm to skip examination of large numbers of nodes that might otherwise have to be tested.

The above-described find function is designed to locate the first extent in a level of the tree structure that is free. By slightly modifying the approach adopted in the find function, it is possible to create a function that looks for extents that are free and located near a given location on the disk. The modification concerns where the search process begins. Instead of looking at the first extent in the target level of the tree, the modified approach looks first at the node that is nearest to the desired location. When searching for possibly free extents, the modified approach walks outward from the nearest node to examine other near nodes and tests the extents represented by the near nodes to see if they are free. The first free extent that is found is the nearest extent that is free.

While the present invention has been described with reference to a preferred embodiment thereof, those skilled in the art will appreciate that various changes in form and detail may be made without departing from the scope of the present invention as defined in the appended claims. For example, the tree structure 32 used in the present invention need not be a binary tree. Each parent node may have more than two children nodes. Furthermore, the allocated or partially allocated state need not be associated with a "1" bit value; rather, the meanings of a "1" bit value and a "0" bit value may be swapped.

We claim:

1. In a data processing system having storage with storage space of a given size, a method of managing the storage space, comprising the steps of:
   (a) modeling the storage space as a tree structure having multiple successively decreasing levels of nodes ranging from a top level to a bottom level, wherein each node represents an extent of the storage space and, for each level, nodes within the level represent extents of a like size, each node in each level other than the bottom level is a parent node having links connecting the parent node to child nodes, that are siblings, in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;
   (b) storing state information about each node in a bitmap that specifies whether the extent represented by the node is known to be at least partially allocated or not; and
   (c) using the bitmap and the tree structure to manage the storage space.

2. The method recited in claim 1 wherein the step of using the bitmap and the tree structure to manage the storage space further comprises the step of allocating an extent of the storage space represented by a node.

3. The method recited in claim 2 wherein the step of allocating an extent of the storage space represented by the node further comprises the steps of:
   (i) updating the state information that is stored in the bitmap about the node to specify that the extent represented by the node is known to be at least partially allocated;
   (ii) examining the state information that is stored in the bitmap about a parent node of the node to determine whether the extent represented by the parent node is known to be at least partially allocated or not;

(iii) where it is determined that the extent represented by the parent node is not known to be at least partially allocated, updating the state information that is stored in the bitmap about the parent node to specify that the extent represented by the parent node is known to be at least partially allocated; and (iv) where it is determined that the extent represented by the parent node is known to be at least partially allocated, maintaining the state information that is stored in the bitmap about the parent node.

4. The method recited in claim 3, further comprising the steps of:

(v) denoting the parent node as a current node;

(vi) determining whether there is an additional parent node for the current node;

(vii) where there is the additional parent node for the current node, examining the state information that is stored in the bitmap about the additional parent node to determine whether the extent represented by the additional parent node is known to be at least partially allocated or not;

(viii) where there is no additional parent node for the current node or where there is the additional extent represented by the parent node for the current node and the additional parent node is known to be at least partially allocated, maintaining the state information stored in the bitmap; and (ix) where there is the additional parent node for the current node and the extent represented by the additional parent node is not known to be at least partially allocated, updating the state information that is stored in the bitmap about the additional parent node to specify that the extent represented by the additional parent node is known to be at least partially allocated.

5. The method recited in claim 4, further comprising the steps of:

(x) denoting the additional parent node as the current node;

(xi) determining whether there is a new additional parent node for the current node; and (xii) where there is the new additional parent node, repeating steps (vii)-(ix) using the new additional parent node as the additional parent node.

6. The method recited in claim 1, wherein the step of using the bitmap and the tree structure to manage the storage space further comprises the step of deallocating an extent of the storage space represented by one of the nodes.

7. The method recited in claim 6 wherein the step of deallocating an extent of the storage space represented by a node further comprises the steps of:

(i) updating the state information that is stored in the bitmap about the node to indicate that the extent represented by the node is not known to be at least partially allocated;

(ii) determining if the node has at least one sibling node; and (iii) if the node has at least one sibling node, examining the state information that is stored in the bitmap about each sibling node to determine if each of the extents represented by the sibling nodes is not known to be at least partially allocated and where it is determined that each of the extents represented by the sibling nodes is not known to be at least partially allocated, updating the state information stored in the bitmap about the parent node to specify the extent represented by the parent node is not known to be at least partially allocated.

8. The method recited in claim 1 wherein the step of modeling allocation of the storage space as the tree structure having multiple successively decreasing levels of nodes further comprises the step of providing the top level to the tree structure which consists of a single node representing an extent comprising all of the storage space.

9. The method recited in claim 1 wherein the step of using the bitmap and the tree structure to manage the storage space further comprises the steps of:

(i) allocating the extent of storage space represented by one of the nodes in the tree structure to hold information; and (ii) and updating the state information held in the bitmap to specify that the allocated extent is known to be at least partially allocated.

10. The method recited in claim 1 wherein the step of using the bitmap and the tree structure to manage the storage space further comprises the steps of:

(i) deallocating an extent of storage space represented by one of the nodes in the tree structure; and (ii) updating the state information held in the bitmap to specify that the deallocated extent node is not known to be at least partially allocated.

11. In a data processing system having a storage with storage space of a given size, a method comprising the steps of:

(a) modeling the storage space as a tree structure having multiple successively decreasing levels of nodes ranging from a top level to a bottom level, wherein each node represents an extent of the storage space, and for each level, nodes within the level represent extents of a like size, each node in each level other than the bottom level is a parent node having links connecting the parent node to child nodes, that are siblings, in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;

(b) storing at least one state bit for each node in an ordered bitmap where the state bits for the nodes are ordered in a breadth first fashion beginning with the top level and continuing in breadth first fashion for each successive level, wherein the state bit for each node specifies whether the extent represented by the node is known to at least partially allocated; and (c) using the bitmap and the tree structure to manage the storage space.

12. The method recited in claim 11 wherein the step of using the bitmap and the tree structure to manage the storage space further comprises the step of allocating an extent represented by one of the nodes.

13. The method recited in claim 12 wherein the step of allocating the extent represented by the node further comprises the steps of:

(i) updating the state bit that is stored in the bitmap about the node to specify that the extent represented by the node is known to be at least partially allocated;

(ii) examining the state bit that is stored in the bitmap about a parent node of the node to determine whether the extent represented by the parent node is known to be at least partially allocated or not;

(iii) where it is determined that the extent represented by the parent node is not known to be at least partially allocated, updating the state bit that is stored in the bitmap about the parent node to specify that the extent represented by the parent node is known to be at least partially allocated; and (iv) where it is determined that the extent represented by the parent node is known to be at least partially allocated, maintaining the state bit that is stored in the bitmap about the parent node.

14. The method recited in claim 13, further comprising the steps of:

(v) denoting the parent node as a current node;

(vi) determining whether there is an additional parent node for the current node;

(v) where there is the additional parent node for the current node, examining the state bit that is stored in the bitmap about the additional parent node to determine whether the extent represented by the additional parent node is known to be at least partially allocated or not;

(vi) where there is no additional parent node for the current node or whether there is the additional parent node for the current node and the extent represented by the additional parent node is known to be at least partially allocated, maintaining the state bit stored in the bitmap; and (vii) where there is the additional parent node for the current node and the extent represented by the additional parent node is not known to be at least partially allocated, updating the state bit that is stored in the bitmap about the additional parent node to specify that the extent represented by the additional parent node is known to be at least partially allocated.

15. The method recited in claim 14, further comprising the steps of:

(viii) denoting the additional parent node as the current node;

(ix) determining whether there is a new additional parent node for the current node; and (x) where there is the new additional parent node repeat steps (v)–(x) using the new additional parent node as the additional parent node.

16. The method recited in claim 11 wherein the step of using the bitmap and the tree structure to manage the storage space further comprises the step of deallocating an extent of the storage space represented by one of the nodes.

17. The method recited in claim 16, further comprising the steps of:

(i) updating the state bit that is stored in the bitmap about the node to indicate that the extent represented by the node is not known to be at least partially allocated;

(ii) determining if the node has at least one sibling node; and (iii) if the node has at least one sibling node, examining the state bit that is stored in the bitmap about each sibling node to determine if each of the extents represented by the sibling nodes is known to be at least partially allocated and updating the state bit stored in the bitmap about the parent node to specify the extent represented by the parent node is not known to be at least partially allocated.

18. The method recited in claim 11 wherein the step of modeling the storage space as the tree structure further comprises the step of modeling the storage space as a binary tree structure.

19. The method as recited in claim 18 wherein the size of the nodes decreases in each successive level by one-half.

20. The method recited in claim 11 wherein the step of storing the state bit for each node in the ordered bitmap further comprises the step of storing the state bit for a node immediately next to the state bit for a sibling node in the ordered bitmap.

21. The method recited in claim 11 wherein the step of modeling the storage space as the tree structure having multiple successively decreasing levels of nodes further comprises the step of providing the top level of the tree structure which consists of a single node representing an extent comprising all of the storage space.

22. In a data processing system having a storage with storage space of a given size, a method of locating free storage space in the storage, comprising the steps of:

(a) modeling the storage space as a tree structure having multiple successively decreasing levels of nodes ranging from a top level to a bottom level, wherein each node represents an extent of the storage space and, for each level, nodes within the level represent extents of a like size, each node in each level other than the bottom level is a parent node having links connecting the parent node to child nodes that are siblings in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;

(b) storing state information about each node in a bitmap that specifies whether the extent is known to be at least partially allocated or not;

(c) examining the state information in the bitmap about a selected one of the nodes in the tree structure that represents an extent of storage space of a desired size;

(d) where the state information in the bitmap about the selected node specifies that the extent represented by the selected node is not known to be at least partially allocated, (i) examining the state information in the bitmap about each sibling of the selected node to determine if any of the siblings are known to be at least partially allocated; and (ii) where any sibling is known to be at least partially allocated, concluding that the selected node is free.

23. The method recited in claim 22, further comprising the steps, of where the state information about the selected node specifies that the extent represented by the selected node is known to be at least partially allocated and additional nodes exist in the tree structure at the same level as the selected node, designating a next node in the tree structure, at the same level as the selected node, as the selected node and repeating the method beginning with step (d).

24. The method recited in claim 23, further comprising the step of storing state information in the bitmap in a breadth first fashion according to ordering of the nodes in the tree structure beginning with the top level and continuing in breadth first fashion for each successive level of nodes.

25. The method recited in claim 24 wherein the next node is a node which has its state information in the bitmap immediately adjacent to the selected node.

26. The method recited in claim 24 wherein the next node is a node which has its state information stored closest in the bitmap to state information for a predetermined node among the nodes of the same level as the selected node and having state information that has not yet been examined in the method.

27. The method recited in claim 22, the method further comprising the steps of, where it is determined that none of the sibling nodes are known to be at least partially allocated:

examining state information in the bitmap about a parent node of the selected node to determine whether the parent node is known to be at least partially allocated; and where the patent node is not known to be at least partially allocated, designating the parent node as the selected node and repeating the method beginning with step (d).

28. The method recited in claim 27, further comprising the steps of, where it is determined that the parent node is known to be at least partially allocated, designating a next node in the tree structure at the same level as the selected node, other than the selected node and the siblings of the selected node, as the selected node and repeating the method beginning with step (d).

29. A computer-readable storage holding instructions for directing a data processing system having storage with storage space of a given size to perform, a method of managing the storage space, said method comprising the steps of:

(a) modeling the storage space as a tree structure having multiple successively decreasing levels of nodes ranging from a top level to a bottom level, wherein each node represents an extent of the storage space and, for each level, nodes within the level represent extents of a like size, each node in each level other than the bottom level is a parent node having links connecting the parent node to child nodes, that are siblings, in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;

(b) storing state information about each node in a bitmap that specifies whether the extent represented by the node is known to be at least partially allocated or not; and (c) using the bitmap and the tree structure to manage the storage space.

30. The computer-readable storage medium of claim 29 wherein the instructions for performing the step of using the bitmap and the tree structure to manage the storage space allocate an extent of the storage space represented by a node.

31. The computer-readable storage medium of claim 30 wherein the instructions for performing the step of allocating an extent of the storage space represented by the node entail the following steps:

(i) updating the state information that is stored in the bitmap about the node to specify that the extent represented by the node is known to be at least partially allocated;

(ii) examining the state information that is stored in the bitmap about a parent node of the node to determine whether the extent represented by the parent node is known to be at least partially allocated or not;

(iii) where it is determined that the extent represented by the parent node is not known to be at least partially allocated, updating the state information that is stored in the bitmap about the parent node to specify that the extent represented by the parent node is known to be at least partially allocated; and (iv) where it is determined that the extent represented by the parent node is known to be at least partially allocated, maintaining the state information that is stored in the bitmap about the parent node.

32. A computer-readable storage medium holding instructions for directing a data processing system having a storage with storage space of a given size to perform a method comprising the steps of:

(a) modeling the storage space as a tree structure having multiple successively decreasing levels of nodes ranging from a top level to a bottom level, wherein each node represents an extent of the storage space, and for each level, nodes within the level represent extents of a like size, each node in each level other than the bottom level is a parent node having links connecting the parent node to child nodes, that are siblings, in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;

(b) storing at least one state bit for each node in an ordered bitmap where the state bits for the nodes are ordered in a breadth first fashion beginning with the top level and continuing in breadth first fashion for each successive level, wherein the state bit for each node specifies whether the extent represented by the node is known to at least partially allocated; and (c) using the bitmap and the tree structure to manage the storage space.

33. The computer-readable storage medium of claim 32 wherein the instructions for performing the step of using the bitmap and the tree structure to manage the storage space allocate an extent represented by one of the nodes.

34. The computer-readable storage medium of claims 32 wherein the instructions for performing the step of using the bitmap and the tree structure to manage the storage space deallocate an extent of the storage space represented by one of the nodes.

35. The computer-readable storage medium of claim 32 wherein the instructions for performing the step of modeling the storage space as the tree structure models the storage space as a binary tree structure.

36. A computer-readable storage medium holding instructions for directing a data processing system having a storage with storage space of a given size to perform a method of locating free storage space in the storage, said method comprising the steps of:

(a) modeling the storage space as a tree structure having multiple successively decreasing levels of nodes ranging from a top level to a bottom level, wherein each node represents an extent of the storage space and, for each level, nodes within the level represent extents of a like size, each node in each level other than the bottom level is a parent node having links connecting the parent node to child nodes that are siblings in a next successive level, the extents represented by the child nodes constitute a complete subdivision of the extent represented by the parent node, the size of the extents represented by the nodes decreases in each successive level and the sum of the sizes of the extents represented by the nodes for each successive level equals the given size of the storage space;

(b) storing state information about each node in a bitmap that specifies whether the extent is known to be at least partially allocated or not;

(c) examining the state information in the bitmap about a selected one of the nodes in the tree structure that represents an extent of storage space of a desired size;

(d) where the state information in the bitmap about the selected node specifies that the extent represented by the selected node is not known to be at least partially allocated, (i) examining the state information in the bitmap about each sibling of the selected node to determine if any of the siblings are known to be at least partially allocated; and (ii) where any sibling is known to be at least partially allocated, concluding that the selected node is free.

* * * * *

UNITED STATES PATENT AND TRADEMARK OFFICE
CERTIFICATE OF CORRECTION

PATENT NO. : 5,713,002
DATED : January 27, 1998
INVENTOR(S) : M. Zbikowski et al.

It is certified that error appears in the above-indentified patent and that said Letters Patent is hereby corrected as shown below:

| COLUMN | LINE | |
|---|---|---|
| 4 | 40 | "represents" should read --representing-- |
| 7 (Claim 6, | 45 line 1) | After "claim 1" delete "," |
| 8 (Claim 9, | 13 line 7) | After "(ii)" delete "and" |
| 8 (Claim 11, | 48 line 24) | After "known to" insert --be-- |
| 9 (Claim 14, | 15 line 6) | "(v)" should read --(vii)-- |
| 9 (Claim 14, | 20 line 11) | "(vi)" should read --(viii)-- |
| 9 (Claim 14, | 26 line 17) | "(vii)" should read --(ix)-- |
| 9 (Claim 15, | 35 line 3) | "(viii)" should read --(x)-- |
| 9 (Claim 15, | 37 line 5) | "(ix)" should read --(xi)-- |

UNITED STATES PATENT AND TRADEMARK OFFICE
CERTIFICATE OF CORRECTION

PATENT NO. : 5,713,002
DATED      : January 27, 1998
INVENTOR(S) : M. Zbikowski et al.

It is certified that error appears in the above-indentified patent and that said Letters Patent is hereby corrected as shown below:

| COLUMN | LINE | |
|---|---|---|
| 9 (Claim 15, | 39 line 7) | "(x)" should read --(xii)-- |
| 9 (Claim 15, | 40 line 8) | "(v)-(x)" should read --(vii)-(xii)-- |
| 10 (Claim 23, | 47 line 2) | "steps, of" should read --steps of,-- |
| 11 (Claim 27, | 8 line 8) | "patent" should read --parent-- |
| 12 (Claim 32, | 30 line 25) | After "known to" insert --be-- |
| 12 (Claim 34, | 38 line 1) | "claims 32" should read --claim 32-- |

Signed and Sealed this

Third Day of August, 1999

Attest:

Q. TODD DICKINSON

*Attesting Officer*    *Acting Commissioner of Patents and Trademarks*